United States Patent Office 3,000,909
Patented Sept. 19, 1961

3,000,909
PROCESS OF PREPARING BUTYLENE OXIDE FROM BUTYLENE CHLOROHYDRIN
George B. Roberts, Wilmington, Del., and Philip H. Moss, Austin, Tex., assignors to Jefferson Chemical Company, Inc., Houston, Tex., a corporation of Delaware
No Drawing. Filed Oct. 29, 1958, Ser. No. 770,267
1 Claim. (Cl. 260—348.6)

This invention relates to an improved method for manufacturing olefin oxides from olefin chlorohydrins, particularly the manufacture of butylene oxides from butylene chlorohydrins.

Methods for the preparation of olefin oxides from the corresponding olefin chlorohydrins are generally well-known. Thus, it is known to react a rich solution of an olefin chlorohydrin with an alkali or caustic solution at a high temperature, i.e., about the boiling point of the solutions, to form the olefin oxide. In another method, a dilute solution of olefin chlorohydrin is maintained at about its boiling point while an alkali is added at a suitable rate to form the olefin oxide which is thereupon distilled from the solution as it is formed so that there is no appreciable accumulation of the oxide in the chlorohydrin solution. According to a more recent method, the olefin chlorohydrin is reacted with an alkali at a temperature above 70° C., preferably between 90° and 150° C. under superatmospheric pressure. This method teaches that it is necessary to remove the olefin oxide product from the reaction liquor to prevent side reactions although the oxide may be permitted to accumulate for a short interval of time, i.e., for a period in the order of two or three minutes.

In contrast to the foregoing methods, which generally employ high temperature to boiling reaction mixtures for the preparation of olefin oxides, a method has been discovered whereby high yields of butylene oxides may be produced from dilute butylene chlorohydrin solutions in a reaction conducted near or even substantially below room temperature. Surprisingly, it has also been discovered that under the proper conditions the butylene oxide product being formed may be continuously accumulated in the reaction mixture during its formation for a substantial period of time, i.e., for a period in excess of 10 minutes and up to 30 minutes or longer or until the reaction is substantially complete without causing harmful side reactions and without loss in the yield of the oxide.

In accordance with this invention, a dilute butylene chlorohydrin solution generally at a temperature in the range of 0°–35° C. is mixed with a cooled alkali solution to initiate the reaction. The mixed solutions are agitated and maintained at a low temperature and atmospheric pressure for a period of time substantially in excess of 10 minutes and until the reaction between the butylene chlorohydrin and the alkali is complete. Thereupon, the solution containing the reaction product is subjected to flash or steam distillation, or distillation under reduced pressure to recover the butylene oxide.

This invention is particularly adapted to the preparation of butylene oxides. Accordingly, the chlorohydrin feed material may be isobutylene chlorohydrin, 1-butene chlorohydrin or 2-butene chlorohydrin. These feed materials are generally prepared by reacting chlorine with water and the resulting mixture with the corresponding butylene to produce a dilute aqueous solution of the butylene chlorohydrin. Normally, such a solution will contain less than about 15% by weight of the chlorohydrin, usually about 5% to 8%. Some free hydrochloric acid is also produced in this process and is present in the dilute solution of the chlorohydrin.

A wide range of alkalies may be employed to react with the chlorohydrin. Suitable materials are the alkali and alkaline earth metal hydroxides and carbonates including sodium hydroxide, calcium hydroxide, potassium hydroxide, sodium carbonate and potassium carbonate. When a dilute chlorohydrin solution having free acid is used, the functions of the alkali are to neutralize the free acid and to provide sufficient alkali to react with the chlorine in the chlorohydrin to bring about olefin oxide formation. A molar excess of the alkali is normally employed in relation to the amount of chlorohydrin and free acid present in the dilute chlorohydrin solution. Generally, this molar excess of alkali over chlorohydrin and free acid will be from about 10% to 100% or more.

A low temperature is critical if the instant process is to produce high yields of the desired butylene oxide. In fact, it is only by virtue of this low temperature that the butylene oxide produced can be continuously accumulated in the reaction mixture without a serious loss of yield due to the formation of by-products. The butylene oxide product is accumulated in the reaction mixture for a period in excess of 10 minutes and generally for a much longer period of time until the reaction is completed. The reaction temperature employed should be a temperature between about 0° and 35° C., temperatures from 15° to 30° C. being preferred.

In practice, a body of dilute butylene chlorohydrin is maintained at a temperature of 0°–35° C. A solution of alkali is prepared and its temperature adjusted until it is in about the same range of 0°–35° C. The cooled alkali solution is then added to the dilute chlorohydrin solution to initiate the reaction. This reaction mixture of alkali and chlorohydrin is intimately admixed and maintained at a reaction temperature below about 35° C. until the reaction is substantially complete.

On completion of the reaction, as determined by titration, the mixture containing the butylene oxide reaction product is treated to recover the butylene oxide. This may be accomplished by subjecting the reaction mixture to steam-stripping, or distillation at atmospheric or reduced pressure. The recovery is conducted under such conditions that the butylene oxide is quickly removed from the reaction mixture thereby minimizing any tendency of the butylene oxide to polymerize, hydrate or react with any of the materials with which it is in contact during its recovery. It is particularly advantageous to have the reaction mixture substantially neutral during the recovery of the butylene oxide.

The following examples illustrate the practice of this invention.

*Example I*

A room temperature 6% isobutylene chlorohydrin solution was prepared containing 0.221 mols of the chlorohydrin. To this was added a cooled 30% sodium hydroxide solution in 10% molar excess over the isobutylene chlorohydrin and hydrochloric acid present in the chlorohydrin solution. The stirred mixture was maintained at atmospheric pressure and at room temperature until titration indicated that the reaction was substantially complete. The reaction was completed over a period of 50 minutes. The reacted solution was thereupon run into a steam-stripping column operated at a head temperature of 75–95° C. and the isobutylene oxide distilled over. Analysis of the product indicated a 92% yield of isobutylene oxide based on the chlorohydrin feed.

*Example II*

A dilute isobutylene chlorohydrin solution containing 0.402 mols of the chlorohydrin was prepared. This solution also contained 0.628 mols of hydrochloric acid. The solution was cooled to 10–15° C. and a calcium hydroxide solution added in 100% molar excess over the chlorohydrin and hydrochloric acid content. The stirred mixture was reacted at atmospheric pressure below room temperature (less than 20° C.) until the reaction was substantially complete, a period of about 20 minutes. On completion of the reaction, the mixture was steam stripped in a packed stripping column by adding it at the top of the column while passing steam upward through the column. The isobutylene oxide and unreacted chlorohydrin were carried overhead as distillate. The yield of recovered isobutylene oxide was 98% based on the mol percent of charge.

*Example III*

A 6% isobutylene chlorohydrin solution (0.44 mols) was added to a flask and cooled to 10–15° C. A 30% solution of sodium hydroxide was added in an amount about equivalent to or in slight excess of the chlorohydrin plus hydrochloric acid. The mixture was stirred and reacted at a low temperature for a period of time in excess of 10 minutes. On completion of the reaction, the pressure on the vessel was reduced to 40–65 mm. of mercury pressure absolute and gentle heat applied to the flask to distill the oxide. The indicated yield of isobutylene oxide was 92%.

1-butene and 2-butene chlorohydrins were reacted with sodium hydroxide under the same general conditions resulting in the production of substantial yields of the corresponding oxides.

Obviously, many modifications and variations of the invention, as hereinbefore set forth, may be made without departing from the spirit and scope thereof, and therefore, only such limitations should be imposed as are indicated in the appended claim.

We claim:

A method for preparing butylene oxide which comprises providing an aqueous solution of a butylene chlorohydrin, said solution consisting of less than about 15% by weight of said chlorohydrin, adding a solution of an alkaline compound selected from a group consisting of the alkali and alkaline earth metal hydroxides and carbonates to form a reaction mixture, said alkaline compound being employed in a 10% to 100% excess of the molar amount of said butylene chlorohydrin, maintaining said mixture at a temperature from 0° to 35° C. for a period of time in excess of 10 minutes up to about 50 minutes to effect substantially complete reaction, and distilling said reaction mixture to recover a distillate consisting essentially of butylene oxide whereby said chlorohydrin is substantially selectively converted to said butylene oxide with minimized by-product formation.

References Cited in the file of this patent

UNITED STATES PATENTS 2,314,039    Evans et al.    Mar. 16, 1943

FOREIGN PATENTS 556,038    Great Britain    Sept. 17, 1943
492,509    Canada    Apr. 28, 1953

OTHER REFERENCES

Montmollen et al.: Helv. Chim. Acta, vol. 7 (1924), pp. 106–111.

Beilstein: Handbuch der Org. Chem., vol. 17 (1933), system No. 2362, page 11, reference 3.

Beilstein: Handbuch der Org. Chem., vol. 17, second supp. (1952), system No. 2362, page 17, references 3 and 5.